United States Patent [19]
Buytaert et al.

[11] Patent Number: 5,757,952
[45] Date of Patent: May 26, 1998

[54] METHOD OF DISPLAYING (A) RADIOGRAPHIC IMAGE (S)

[75] Inventors: Tom Guido Buytaert, Kontich; Lucien Alfred Hayen, Antwerp; Pieter Paul Vuylsteke, Mortsel, all of Belgium

[73] Assignee: AGFA-Gevaert, Mortsel, Belgium

[21] Appl. No.: 571,742

[22] Filed: Dec. 13, 1995

Related U.S. Application Data

[63] Continuation of Ser. No. 83,915, Jun. 28, 1993, abandoned.

[30] Foreign Application Priority Data

Feb. 11, 1993 [EP] European Pat. Off. ............ 93200373

[51] Int. Cl.⁶ .................. G06K 9/00; G06K 9/40
[52] U.S. Cl. ................. 382/132; 382/274; 382/299
[58] Field of Search ................... 382/132, 240, 382/254, 274, 302, 128, 260, 275, 299

[56] References Cited

U.S. PATENT DOCUMENTS

| | | | |
|---|---|---|---|
| 4,315,318 | 2/1982 | Kato | 382/128 |
| 4,870,497 | 9/1989 | Chamzas et al. | 358/426 |
| 4,969,204 | 11/1990 | Melnychuck et al. | 382/56 |
| 5,048,111 | 9/1991 | Jones et al. | 382/56 |
| 5,202,760 | 4/1993 | Tourtier et al | 358/133 |
| 5,235,420 | 8/1993 | Gharavi | 358/133 |
| 5,297,219 | 3/1994 | Weldy | 382/56 |
| 5,325,449 | 6/1994 | Burt et al. | 382/56 |
| 5,454,044 | 9/1995 | Nakajima | 382/132 |
| 5,467,404 | 11/1995 | Vuylsteke et al. | 382/274 |

FOREIGN PATENT DOCUMENTS 0146728 10/1931 European Pat. Off. .

OTHER PUBLICATIONS

European Search Report EP 93 20 0373.

*Primary Examiner*—Leo Boudreau
*Assistant Examiner*—Bhavesh Mehta
*Attorney, Agent, or Firm*—Richard J. Birch

[57] ABSTRACT

Method of displaying (a) radiographic image(s). A method and apparatus for displaying radiographic image(s) is disclosed. The image is decomposed into detail images at multiple resolution levels and a residual image, detail images are then modified and together with the residual images subjected to a reconstruction process wherein modified detail images are only taken into account up to a displayable resolution level.

10 Claims, 7 Drawing Sheets

| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

FIG. 5 power function p=0.7

METHOD OF DISPLAYING (A) RADIOGRAPHIC IMAGE (S)

This application is a continuation of application Ser. No. 08/083,915 filed on Jun. 28, 1993, now abandoned.

FIELD OF THE INVENTION

The present invention is in the field of digital radiography and more specifically relates to processing and display of digital radiographic images on a workstation.

BACKGROUND OF THE INVENTION

In the field of digital radiography a wide variety of image acquisition techniques have been developed such as computerised tomography, nuclear magnetic resonance, ultrasound, detection of a radiation image by means of a CCD sensor or a video camera, radiographic film scanning etc.

In still another technique a radiation image, for example an image of x-rays transmitted by an object, is stored in a screen comprising a photostimulable phosphor such as one of the phosphors described in European patent publication 503 702 published on Sep. 16, 1992 and U.S. Ser. No. 07/842,603. The technique for reading out the stored radiation image consists of scanning the screen with stimulating radiation, such as laser light of the appropriate wavelength, detecting the light emitted upon stimulation and converting the emitted light into an electric representation for example by means of a photomultiplier and digitizing the signal.

The digital images obtained by one of the acquisition techniques described hereinbefore can be stored on a graphic workstation for retrieval at any time by an operator and for processing or reprocessing and display on a CRT screen or the like.

The number of pixels in the digitale radiographic image is commonly far greater than the addressable number of pixels on the display screen of the workstation.

For example, in case of a digital radiographic image obtained by read out of an exposed photostimulable phosphor plate, the number of pixels in the digital image representation typically amounts to 2000 times 2500 pixels or even more whereas commercially available display screens, for example CRT screens typically can display not more than 1000 by 1200 pixels. The number of pixels in the digital image representation is only indicative since the number of pixels in the pixel matrix may depend for example on the dimensions of the photostimulable phosphor screen and may for some dimensions exceed this number.

In any case, if a radiographic image represented by a greater number of pixels than the addressable number on the display device is to be displayed, some sort of pixel number reduction has to be performed.

The problem caused by the addressability of the display device of the workstation being smaller than the number of pixels in the digital image representation is even more accentuated when more than one image need to be displayed simultaneously.

This situation occurs very frequently since most radiographic examinations involve more than one exposure and in a similar way as in classical radiography the radiologist wants to have an overview of the resulting images of interrelated examinations next to each other for comparison or selection of a particular image.

At first instance the radiologist is not interested in the detail information in an individual image but likes to have a so called "image-directory", being an overview image giving indications of the general content of each of the images so as to enable him to select images for further examination.

U.S. Pat. No. 5,015,854 issued May 14, 1991 discloses a configuration of a workstation to be interfaced with a signal gathering apparatus. The disclosure deals in particular with the retrieval of particular images out of said large number of images stored in a storage device. The retrieval is performed with the aid of outline images. When a stored image is to be retrieved by the operator of the workstation, a number of outline images is displayed simultaneously on the display device so that the operator can select the image of interest on the basis of low detailed pictorial information displayed on the monitor screen. On the basis of this selection he can order display of the complete non-reduced image. Outline images are according to an example described in this application obtained by subsampling, for example by sampling the signal components at every third row and every third column in the array of pixel elements.

This method is disadvantageous because on line processing is a time consuming procedure. In addition, subsampling may induce aliasing, being the occurrence of frequency related patterns in the image.

In our European patent application 92201106.9 filed Apr. 21, 1992 a radiation image display method is described that enables quasi immediate evaluation after exposure and read-out of the phosphor screen and still gives the operator a reasonable amount of time to make an evaluation on the basis of this display without retarding the operation and the throughput of the read-out apparatus. The application typically relates to a preview display. According to the method described in the captioned application a reduced image signal comprising less pixels than the radiation image is extracted from each sequentially read-out image signal. Then, a composed signal representing a mosaic type image is composed by means of a number of reduced image signals, and this composed signal is applied to a monitor for display. As a new reduced signal is deduced, said composed signal is amended by means of said new signal so that at least one of the reduced images in the displayed image is replaced by the image represented by said new reduced signal and the amended signal is applied to said monitor.

In a preferred embodiment the reduced signal version is a low resolution approximation obtained by decomposing the image signal into a sequence of detail images at multiple resolution levels and a residual image as described in our European patent application 91202079.9 filed on Jul. 30, 1992 and in U.S. Ser. No. 07/924,905.

OBJECTS OF THE INVENTION

It is an object of the present invention to provide a method of displaying a radiographic image represented as a digital pixel matrix on a display device with a smaller addressable number of pixels than the number of pixels in the original pixel matrix representing the radiographic image.

It is a further object of the present invention to provide such a method that operates fast and requires as less as possible additional computational effort.

It is still a further object to provide a method of displaying an image directory on a display device with a limited number of addressable pixels in a fast and computational inexpensive way.

It is still a further object to provide an apparatus wherein the method of the present invention is implemented.

STATEMENT OF THE INVENTION

The problems of the present invention are solved by a method of displaying on a display device a radiographic image represented as a digital signal comprising the steps of decomposing the image representation into a sequence of detail images at multiple resolution levels and a residual image, storing said detail images and said residual image in a memory device.

retrieving the stored images, modifying pixel values of said retrieved detail images to yield pixel values of a set of modified detail images, computing a processed image by applying a reconstruction algorithm to the residual image and the retrieved and modified detail images, the reconstruction algorithm being such that if it were applied to the residual image and all detail images without modification, then said original image or a close approximation thereof would be obtained, wherein retrieval of detail images is limited to detail images up to a specific resolution level so that the processed image after that reconstruction has a resolution that is equal to or smaller than the resolution of said display device, and displaying said reconstructed image.

The method of the present invention is advantageous over the prior art methods for the following reasons:

The method enables display of an image that is originally represented by a pixel matrix with a number of pixels exceeding the resolution of the display device. -The method provides an enhanced (processed) image. -The method is fast since it does not require retrieval of the entire pixel matrix of an image from a storage device, which in case of an image of 5 million pixels (10 Mbit) is a time consuming operation; -The method provides a most efficient and computationally non-expensive solution for the envisioned problem since the reconstruction process is limited up to a displayable resolution, the complete reconstruction procedure operating on the entire pixel matrix can be postponed until the complete evaluation and processing procedure which is made on the displayed image is completed.

When applied in a context of the image enhancing process as described in our European patent application 91202079.9 filed on Jul. 30, 1992 and in U.S. Ser. No. 07/924,905 wherein inherently is disposed of a decomposed image representation, this method is most efficient and fast because it does not require any additional transformation of pixel values but makes use of intermediate processing results.

The method of the present invention avoids aliasing (artefacts in the form of frequency related line patterns).

Several examples of the decomposition procedure of an original image signal into a sequence of detail images and a residual image are described in our European patent application 91202079.9 filed on Jul. 30, 1992 and in U.S. Ser. No. 07/924,905.

In one embodiment of the signal processing method, the multiresolution representation obtained after decomposition has a pyramidal structure such that the resolution level of the detail images differs by a factor of 2, and the detail images at each resolution level are calculated by filtering the original image with the difference of two low-pass filters and by subsampling the resulting image by a factor 2.

The used filter preferably has a two dimensional Gaussian distribution.

As already mentioned, when the above described type of processing is applied for contrast enhancement, one already inherently disposes of a decomposed image and hence use of one of the detail images for the purpose of display does not induce any additional computational effort.

Pyramidal image decomposition is further preferred over alternative methods such as simple subsampling because the alternative methods induce frequency related patterns (line structures) referred to as "aliasing".

According to the image processing method described in this application the pixel values of said detail images are modified to yield pixel values of a set of modified detail images. Preferably, the modification is performed according to at least one non-linear monotonically increasing odd mapping function with a slope that gradually decreases with increasing argument values.

Alternative processing methods may be applied such as noise reduction processing as described in our European application 92201802.3 filed Jun. 19, 1992, alternative contrast enhancement procedures, grey scale transforms, and other algorithms that optimize the diagnostic quality of an image, processing affecting the image orientation etc.

Finally a processed image is computed by applying a reconstruction algorithm to the residual image and the modified detail images. The above mentioned European application describes such-like reconstruction algorithms.

Another aspect of the present invention relates to the display of an image directory.

Regarding this aspect the invention provides a method of displaying on a display device a number of radiographic images each represented as a digital signal representation, comprising the steps of decomposing the signal representation of each image into a sequence of detail images at multiple resolution levels and a residual image, storing in a memory for each image said detail images and the residual image, selecting a number of radiographic images to be displayed, retrieving for each selected image the stored images, modifying for each image pixel values of retrieved detail images to yield pixel values of a set of modified detail images, computing for each image a processed image by applying a reconstruction algorithm to the residual image and the modified detail images, the reconstruction algorithm being such that if it were applied to the residual image and all detail images without modification, then said original image or a close approximation thereof would be obtained, producing by means of said reconstructed images a signal representation of a composed image, wherein for each image the retrieval of detail images is limited to detail images up to a certain resolution level providing after reconstruction and composition a composed image that has a resolution that is equal to or smaller than the resolution of said display device, displaying said composed image on said display device.

In this context by the term "composed image" is meant an image that is composed of a number of juxtaposed individual radiographic images to be displayed simultaneously such as an image directory.

The above method can be applied for composing and displaying an image directory in a fast and computationally inexpensive way and for displaying images that are to be compared by the radiologist side by side.

In one embodiment of the invention the images are each provided with at least one identification item which is stored together with the detail images and residual image resulting from decomposition. Images with at least one identical identification item, for example relating to the same examination type or to the same patient, are selected to be used for composition of the composed image and for display.

The methods of the present invention can be applied in a system wherein a radiographic image is stored in a photostimulable phosphor screen by exposing such a screen to an image of an object that is irradiated by x-rays.

The signal representation is obtained by scanning said screen with stimulating irradiation, detecting the light emitted upon stimulation and converting the detected light into a digital signal representation. This signal representation can then be processed for various purposes such as contrast enhancement or noise reduction, for example by applying the method described in the already mentioned European patent application 91202079.9 and in U.S. Ser. No. 07/1924,905.

After processing the signal can be applied to a recorder for hardcopy recording or, as has already been described, the signal can also be stored in the memory of a work station where it can be retrieved at any time for further processing or re-processing or display.

The invention also discloses an apparatus by means of which the present invention can be implemented. The apparatus will be described in detail with reference to the drawings hereinbelow.

BRIEF DESCRIPTION OF THE DRAWINGS

Particular aspects of the present invention as well as preferred embodiments thereof will be explained by means of the corresponding drawings wherein FIG. 7 illustrates a specific reconstruction process, A simplified block diagram of a system in which the method of the invention can be implemented is shown in FIG. 1.

Figure 1:
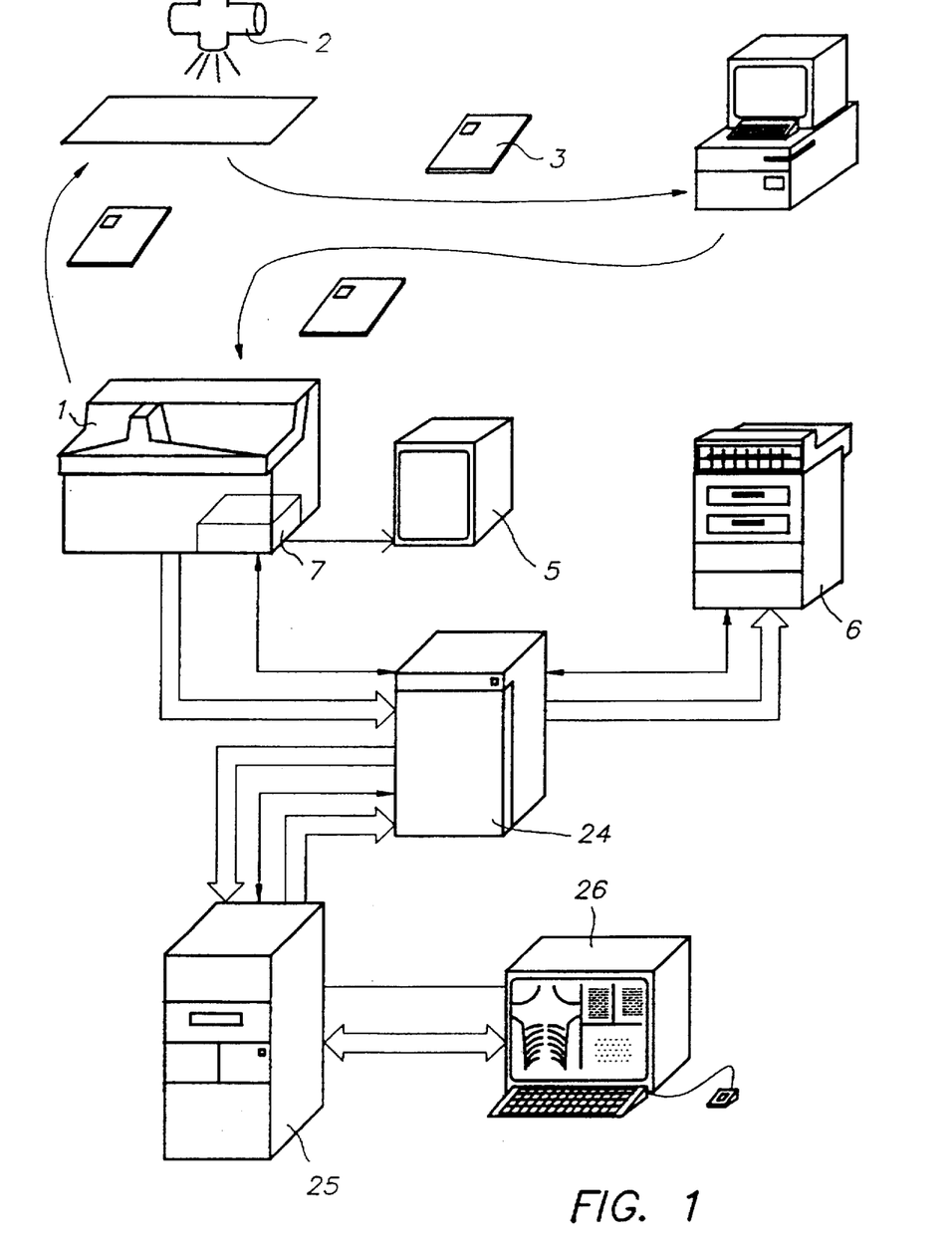
FIG. 1 is a general view of a system in which the method of the present invention can be applied.

A radiation image of an object was recorded on a photostimulable phosphor screen (3) by exposing (2) said screen to x-rays transmitted through the object (not shown). The stimulable phosphor screen was conveyed in A cassette (3) provided with an electrically erasable programmable read only memory (EEPROM). In an identification station 4 various kinds of data, for example patient identification data (name, date of birth) and data relating to the exposure and/or to the signal processing were written into the EEPROM.

Figure 2:
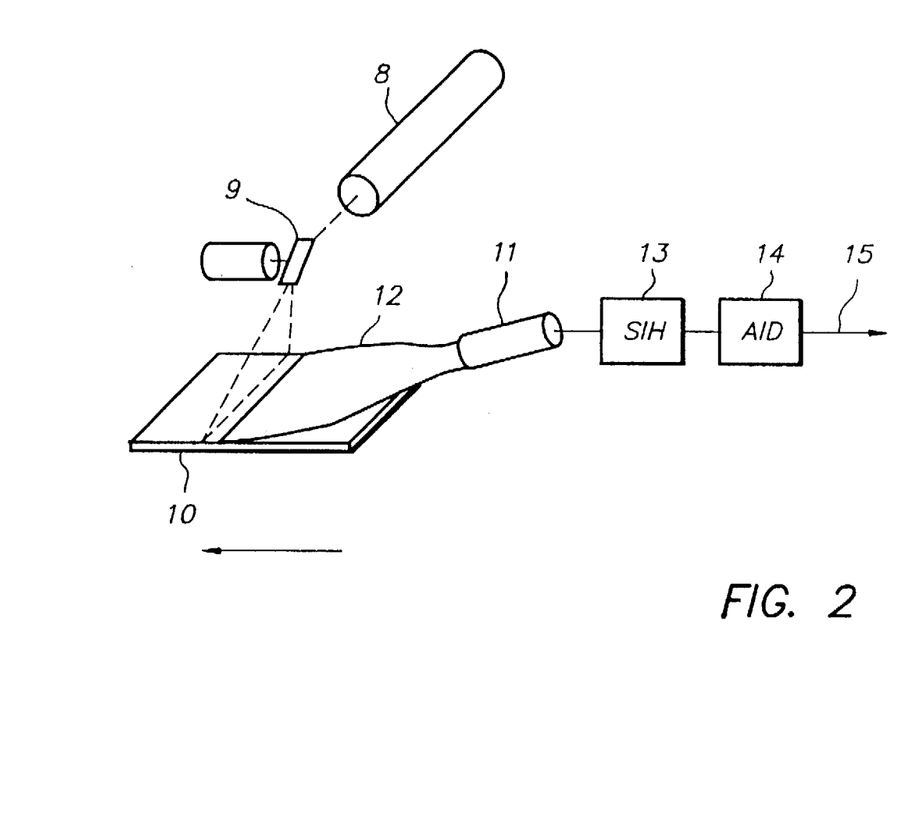
FIG. 2 is a detailed view of a system for reading an image stored in a photostimulable phosphor screen.

In a radiation image read-out apparatus 1 the information stored in the EEPROM and the image stored in the photostimulable phosphor screen were read-out. The stored image was read-out by scanning the phosphor screen with stimulating rays emitted by a laser 8. The stimulating rays were deflected into the main scanning direction by means of galvanometric deflection 9. The subscanning was performed by transporting the phosphor screen in the subscanning direction 10. The stimulated emission was directed by means of a light collector 12 onto a photomultiplier 11 for conversion into an electrical image re presentation. Next, the signal was sampled by a sample and hold circuit 13, and converted into a 12 bit signal by means of an analog to digital convertor 14. The digital image signal 15 was sent to the image processing module of the read-out apparatus (FIG. 1, numeral 7) where it was stored in an internal buffer. The digital image signal was subjected to a decomposition into detail images at multiple resolution levels and a residual image and was then also sent from the image processor to a preview moniter 5 which gives a first impression of of the acquired image and hence will provide for early feedback to the operator in case the acquisition went wrong.

Figure 3:
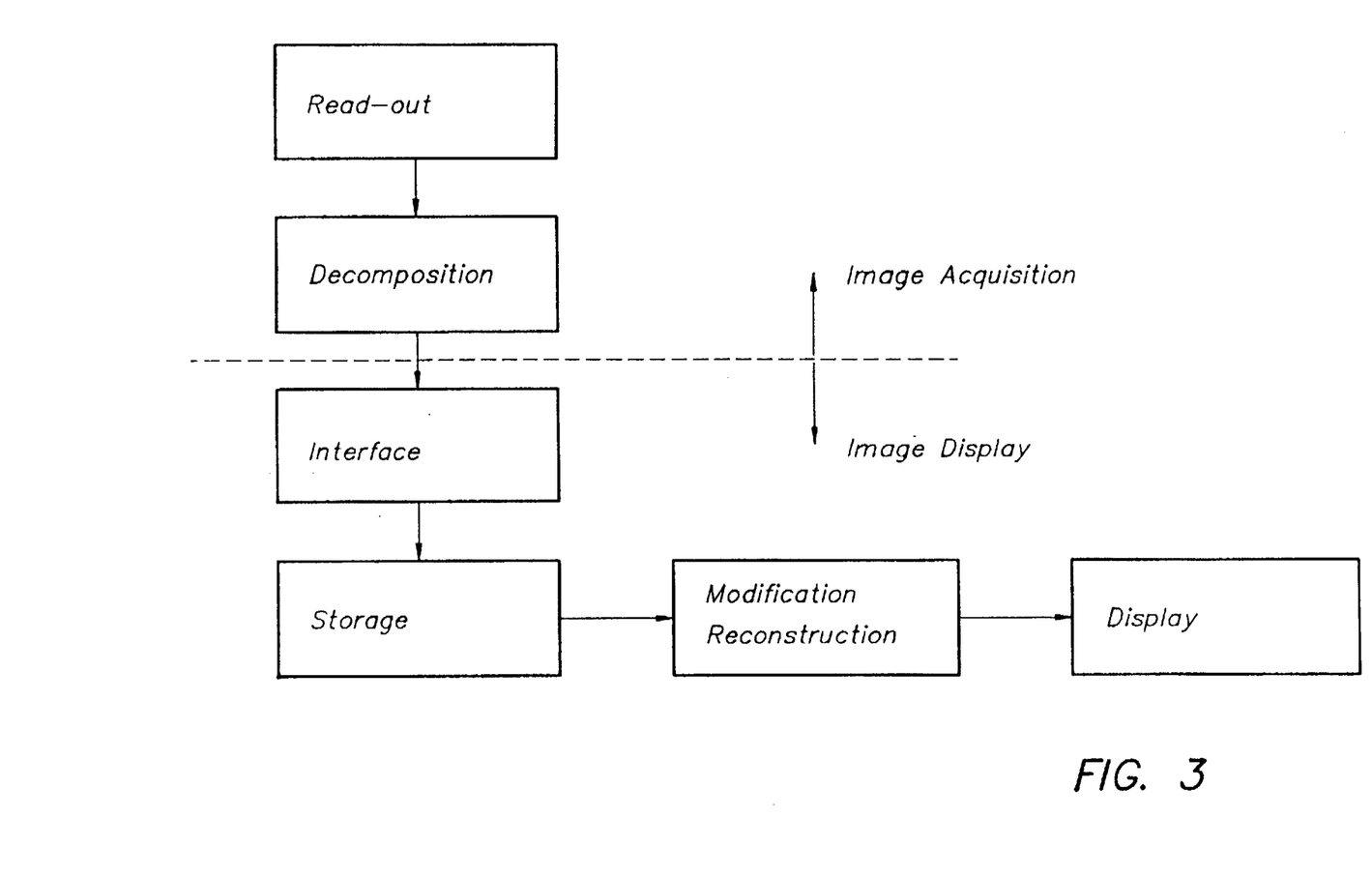
FIG. 3 is a block scheme illustrating the method of the invention.

The decomposed digital image signal was also sent via a buffer 24 to the image workstation 25,26 (25 indicating the review console and 26 indicating the review terminal) where it was temporarily stored on hard disc (cfr. FIG. 3).

FIG. 3 illustrates a workstation interfaced with a read-out apparatus.

In the workstation the detail images at multiple resolution levels stored on the hard disc are retrieved (retrieval control means not shown) up to a maximum resolution level so that, when the retrieved detail images are modified and subjected to a reconstruction procedure, a reconstructed image results that has a resolution that is below the resolution of the display screen of the workstation.

In an alternative embodiment (not shown) the workstation additionally comprises means for composing an image comprising more than one reconstructed image. In this case detail images are retrieved up to a specific resolution level so that the resolution of the composed image is equal to or smaller than the of the display device.

Figure 4:
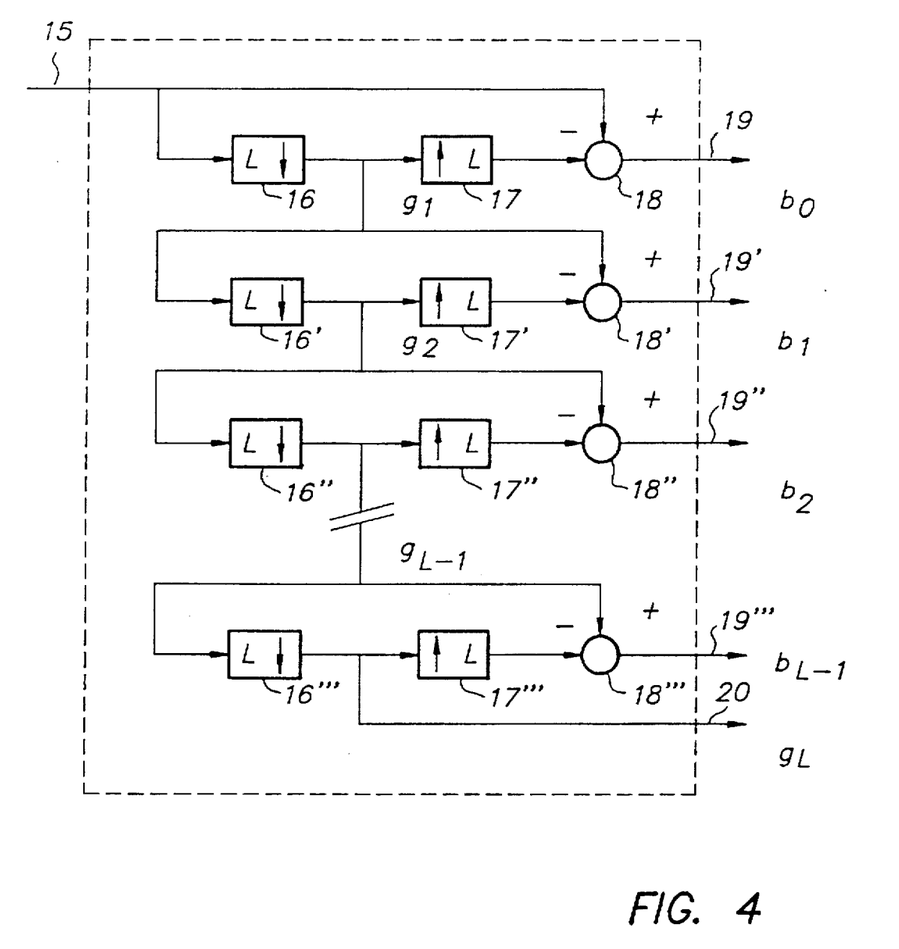
FIG. 4 illustrates a specific decomposition method.

One embodiment of a decomposition process is illustrated in FIG. 4. The original image 15 is filtered by means of a low pass filter 16, and subsampled by a factor of two, which is implemented by computing the resulting low pass image $g_1$ only at every other pixel position of every alternate row.

A detail image $b_0$ at the finest level is obtained by interpolating the low pass image $g_1$, while at the same time inserting an extra column and row every other column and row respectively, and pixelwise subtracting the interpolated image from the original image 15. The interpolation is effectuated by the interpolator 17, which inserts a column of zero values every other column, and a row of zero values every other row respectively, and next convolves the extended image with a low pass filter. The subtraction is done by the adder 18.

The same process is repeated on the low pass image $g_1$, instead of the original image 15, yielding a low pass image $g_1$, and a detail image $b_1$. A sequence of detail images $b_i$, i=0..L−1 and a residual low pass image g.L is obtained by iterating the above process L times.

The finest detail image $b_0$ has the same size as the original image. The next coarser detail image $b_1$ has only half as many rows and columns as the first detail image $b_0$. At each step of the iteration the characteristic spatial frequency of the resulting detail image is only half of that of the previous finer detail image, and also the number of columns and rows is halved, in accordance with the Nyquist criterion. After the last iteration a residual image gL 20 is left which can be considered to be a very low resolution approximation of the original image. In the extreme case it consists of only 1 pixel which represents the average value of the original image 15.

Figure 5:
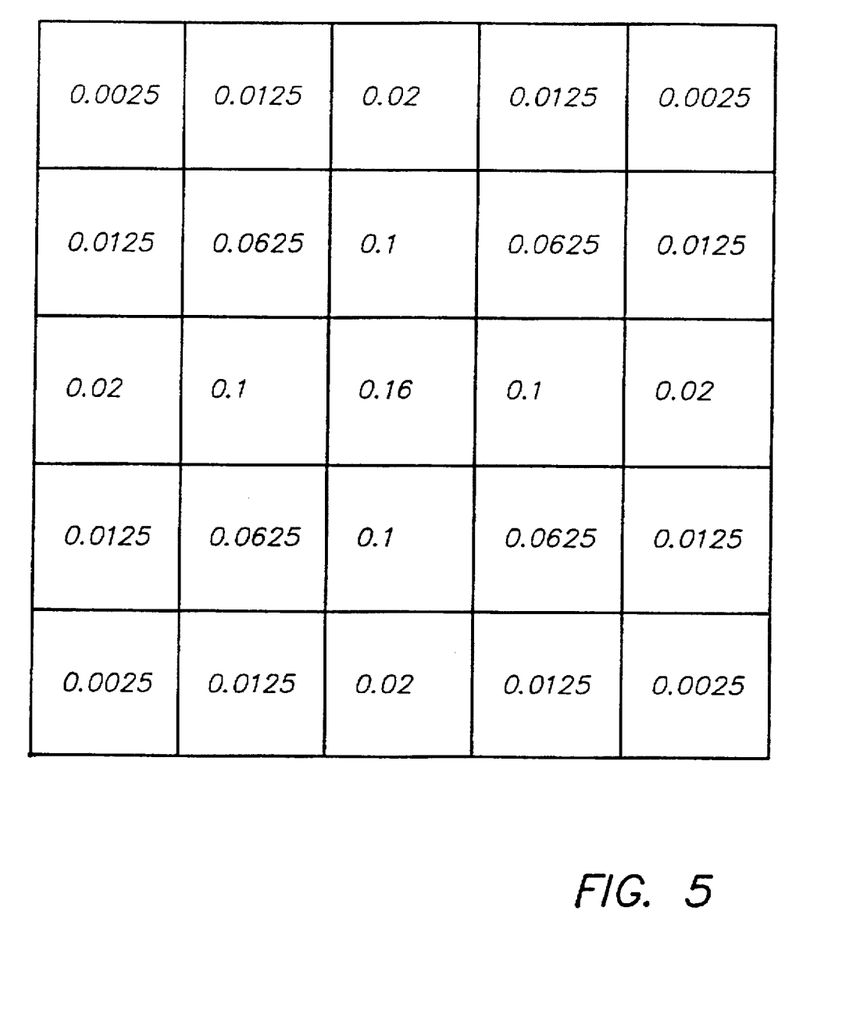
FIG. 5 is an example of a filter used in the decomposition procedure.

The filter coefficients of the low pass filter of the preferred embodiment are presented in FIG. 5. They correspond approximately to the samples of a two dimensional gaussian distribution on a 5×5 grid. The same filter coefficients are used for the low pass filters 16, 16', . . . 16''' at all scales. The same filter kernel with all coefficients multiplied by 4 is also used within the interpolators 17, 17', . . . 17'''. The factor of 4 compensates for the insertion of zero pixel columns and rows.

Figure 6:
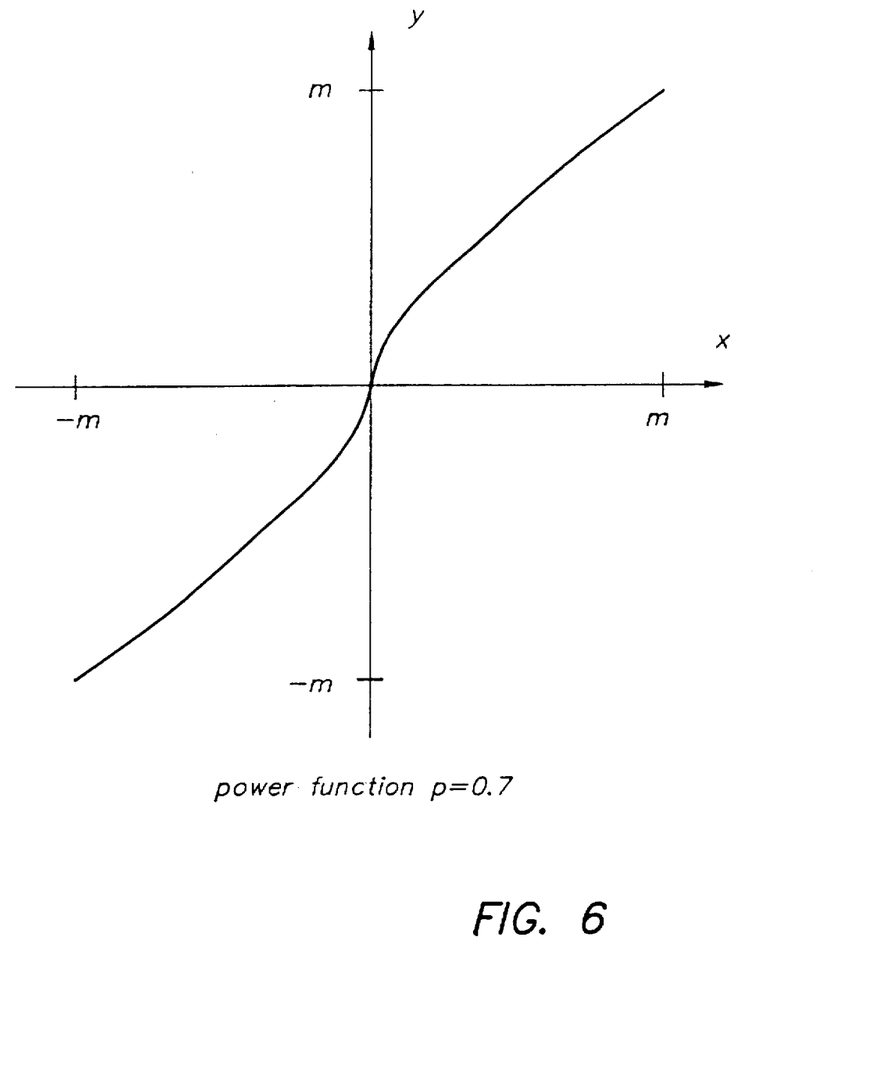
FIG. 6 is an example of a modifying function.

In a modification section (cfr. FIG. 3) the resulting detail image 19, which represents the amount of local detail at subsequent resolution levels is next modified by means of a non-linear mapping operation. An example of a modifying function is shown in FIG. 6.

Figure 7:
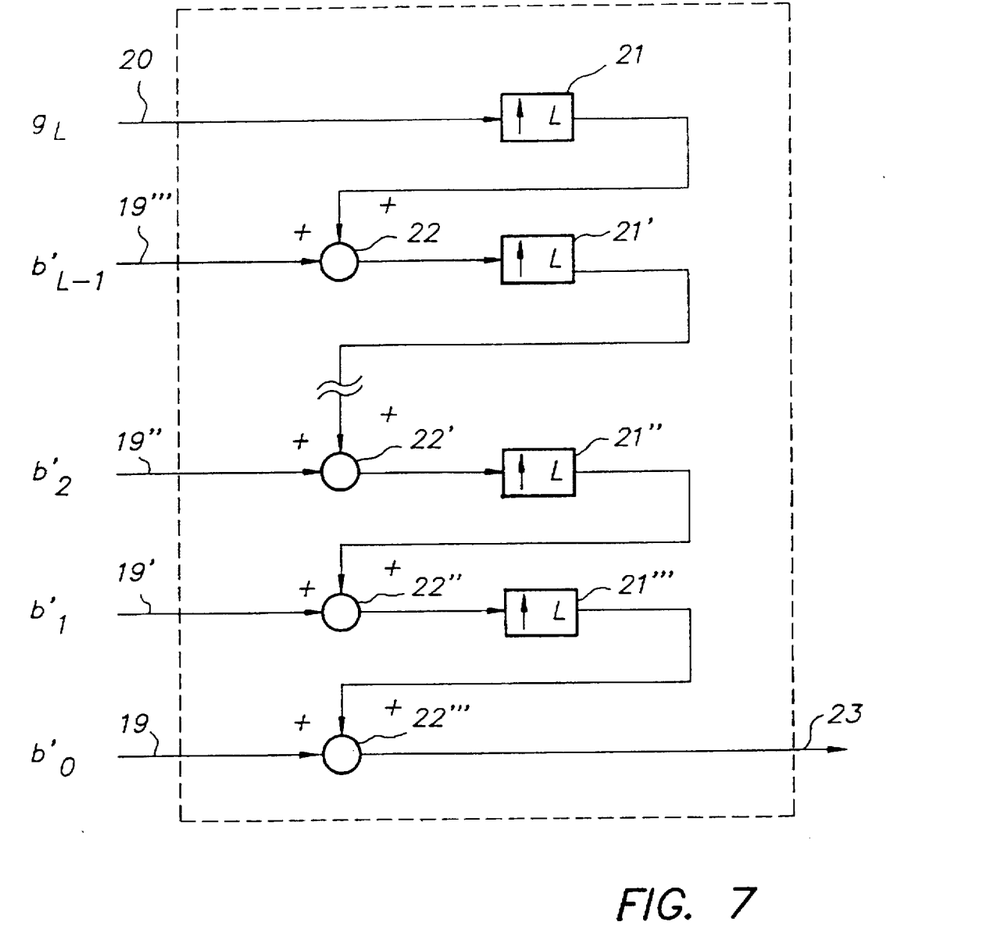

The reconstruction process (cfr. FIG. 3) is depicted in FIG. 7.

The residual image 20 is first interpolated by interpolator 21 to twice its original size and the interpolated image is next pixelwise added to the detail image 19'" of the coarsest level b'$_{L-1}$, using adder 22.

The resulting image is interpolated and added to the next finer detail image. When this process is iterated L times using the unmodified detail images b$_{L-1}$ ... b$_0$ then the original image 15 will result. When at the other hand the detail images are modified before reconstruction according to the findings of the present invention, then a contrast enhanced image 23 will result. The interpolators 21, 21'. . . 21'" are identical to those used in the decomposition section.

For the purpose of display of a single image on the display screen of the workstation, detail images b$_i$ were retrieved up to a resolution level so that the resolution of the reconstructed image is smaller than or equal to that of the display screen.

The workstation was equipped with a graphic user interface wherein pre-programmed processing procedures can be specified, selected and initiated by using icons, menu's, lists etc.. This graphic user interface for example provides selection of a number of display functionalities such as display of one image (as described higher), display of two (or more) images for comparison or display of an image directory, etc. In the latter two cases, a composed image was built from more than one reconstructed image. Retrieval of detail images for each of the components of the composed image was then limited to a resolution level so that the image composed of the reconstructed images could be displayed given the limited resolution of the display screen.

We claim:

1. A method of displaying on a display device a radiographic image represented as a digital signal comprising the steps of decomposing the image representation into a sequence of detail images at multiple resolution levels and a residual image, storing said detail images and said residual image in a memory device, retrieving the stored images, modifying pixel values of retrieved detail images to yield pixel values of a set of modified detail images by applying to the pixel values of the retrieved detail images at least one nonlinear monotonically increasing odd mapping function with a slope that gradually decreases with increasing argument values, computing a processed image by applying a reconstruction algorithm to the residual image and the retrieved and modified detail images, the reconstruction algorithm being such that if it were applied to the residual image and all detail images without modification, then said original image or a close approximation thereof would be obtained, wherein retrieval of detail images is limited to detail images up to a specific resolution level so that the processed image after reconstruction has a resolution that is equal to or smaller than the resolution of said display device, and displaying said reconstructed image.

2. A method according to claim 1 wherein the decomposed image has a pyramidal structure such that the resolution level of the detail images differs by a factor of 2, and the detail images at each resolution level are calculated by filtering the original image with the difference of two low-pass filters and by subsampling the resulting image by a factor 2.

3. A method according to claim 1 wherein said radiographic image is stored in a photostimulable phosphor screen and wherein said digital image representation is obtained by scanning said screen with stimulating irradiation, detecting light emitted upon stimulation and converting said detected light into a digital signal representation.

4. A method of displaying on a display device a number of radiographic images each represented as a digital signal representation, comprising the steps of decomposing the signal representation of each image into a sequence of detail images at multiple resolution levels and a residual image, storing in a memory for each image said detail images and the residual image, selecting a number of radiographic images to be displayed, retrieving for each selected image stored images, modifying for each image pixel values of said retrieved images to yield pixel values of a set of modified detail images by applying to the pixel values of the retrieved detail images at least one nonlinear monotonically increasing odd mapping function with a slope that gradually decreases with increasing argument values, computing for each image a processed image by applying a reconstruction algorithm to the residual image and the retrieved and modified detail images, the reconstruction algorithm being such that if it were applied to the residual image and all detail images without modification, then said original image or a close approximation thereof would be obtained, producing by means of said reconstructed images a signal representation of a composed image, wherein for each image the retrieval of detail images is limited to detail images up to a certain resolution level providing after reconstruction and composition a composed image that has a resolution that is equal to or smaller than the resolution of said display device, and displaying said composed image on said display device.

5. A method according to claim 4 wherein the decomposed image has a pyramidal structure such that the resolution level of the detail images differs by a factor of 2, and the detail images at each resolution level are calculated by filtering the original image with the difference of two low-pass filters and by subsampling the resulting image by a factor 2.

6. A method according to claim 4 wherein said radiographic image is stored in a photostimulable phosphor screen and wherein said digital image representation is obtained by scanning said screen with stimulating irradiation, detecting light emitted upon stimulation and converting said detected light into a digital signal representation.

7. A radiation image displaying apparatus comprising
means for interfacing said displaying apparatus with an apparatus for acquiring a digital signal representation of a radiographic image, said acquisition apparatus being provided with first processing means for decomposing said digital signal representation each image with the image has a detail each image with the into detail images at multiple resolution levels and a residual image, display means, means for storing said detail images and said residual image, means for controlling retrieval of stored images, means for modifying pixel values of retrieved detail images to yield pixel values of a set of modified detail images by applying to the pixel values of the retrieved detail images at least one nonlinear monotonically increasing odd mapping function with a slope that gradually decreases with increasing argument values, means for computing for each image a processed image by applying a reconstruction algorithm to the retrieved residual image and the retrieved and modified detail images, the reconstruction algorithm being such that if it were applied to the residual image and all detail images without modification, then said original image or a close approximation thereof would be obtained, wherein said controlling means controls retrieval of detail images at multiple resolution levels up to a resolution so that the resolution of the reconstructed image is less than the resolution of said display means, and means for controlling display of said reconstructed image.

8. An apparatus according to claim 7 modified in that means are provided for composing with a number of reconstructed images a composed image and that said controlling means controls retrieval of detail images at multiple resolution levels up to a specific resolution level so that the resolution of the composed image is less than the resolution of the display means.

9. An apparatus according to claim 7 comprising a graphic user interface for selection of an image and of display functionalities and for specifying (a) pre-programmed processing procedure(s).

10. An apparatus according to claim 7 wherein said radiographic image has been stored in a photostimulable phosphor screen and wherein said apparatus for acquiring a digital signal representation of a radiographic image comprises means for scanning a photostimulable phosphor screen with stimulating irradiation, means for detecting the light emitted upon stimulation and means for converting the detected light into a signal representation.

* * * * *